No. 868,731. PATENTED OCT. 22, 1907.
T. F. VAN LUVEN.
RUNNING GEAR FOR VEHICLES.
APPLICATION FILED APR. 12, 1906.

Witnesses.

Inventor.
T. F. Van Luven
by
C. J. Fetherstonhaugh
Atty.

UNITED STATES PATENT OFFICE.

THOMAS FRASER VAN LUVEN, OF COLLINS BAY, ONTARIO, CANADA, ASSIGNOR OF ONE-HALF TO ALBERT WESLEY BENJAMIN, OF YARKER, CANADA.

RUNNING-GEAR FOR VEHICLES.

No. 868,731.            Specification of Letters Patent.            Patented Oct. 22, 1907.

Application filed April 12, 1906. Serial No. 311,346.

*To all whom it may concern:*

Be it known that I, THOMAS FRASER VAN LUVEN, of the town of Collins Bay, in the county of Frontenac, Province of Ontario, in the Dominion of Canada, have invented certain new and useful Improvements in Running-Gears for Vehicles; and I do hereby declare that the following is a full, clear, and exact description of the same.

The invention relates to an improvement in a running gear for vehicles as described in the present specification and illustrated by the accompanying drawings that form part of the same.

The invention consists essentially of suitably housed bearings supported from the vehicle body, a rotating axle mounted in said bearings, wheels mounted at the ends of said axle and turning thereon.

The objects of the invention are to relieve the friction incident to the rotating of the wheels and thereby decrease the cost of maintenance of the running gear and to obviate the troubles arising from inaccuracies in the construction of the bearings or the sudden sticking of the axle in said bearings, and to devise a device of durable construction and cheap to manufacture.

Figure 1:
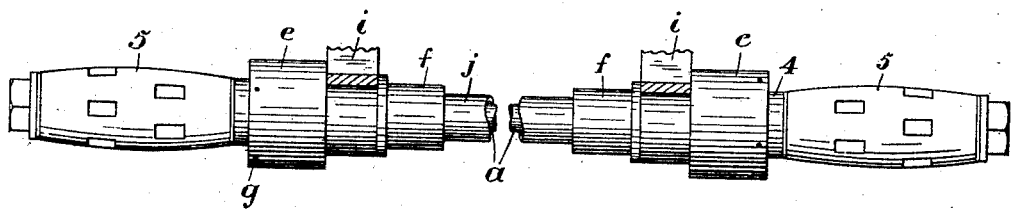
Figure 2:
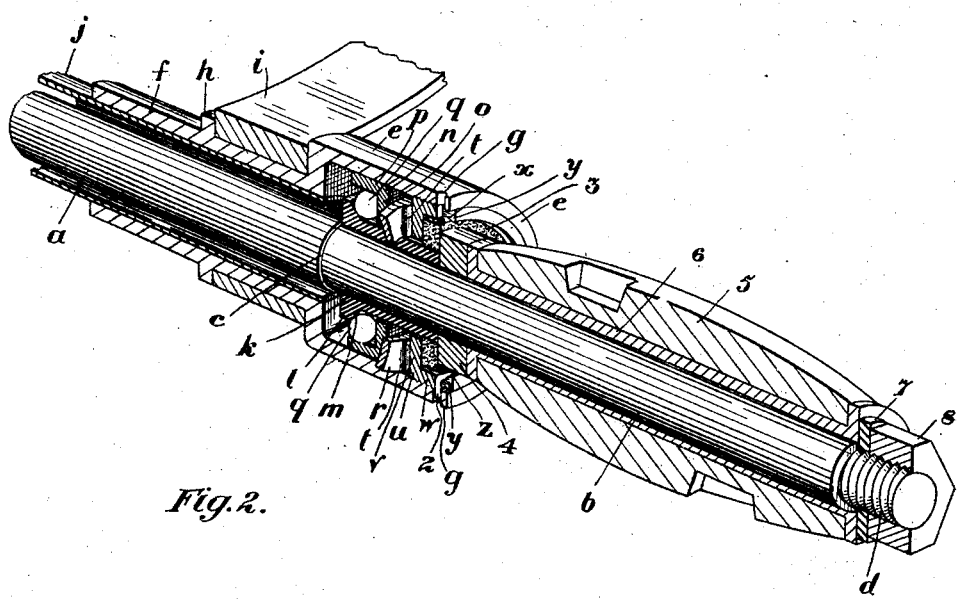
Figure 3:
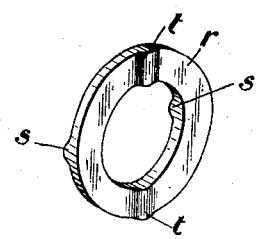

In the drawings Figure 1 is an elevation of an axle broken away in the middle and showing my invention applied thereto. Fig. 2 is an enlarged longitudinal sectional detail of the hub and the axle bearing showing the axle arranged therein. Fig. 3 is an enlarged perspective detail of a member of the axle bearing.

Like letters of reference indicate corresponding parts in each figure.

Referring to the drawings, $a$ is the rotating axle having the ends $b$ reduced and forming the shoulders $c$ and the threaded outer ends $d$.

$e$ are cylindrical casings forming housings for the axle bearings and are open at the outer ends thereof and having the sleeve portions $f$ extending inwardly therefrom and encircling the axle $a$. The casings $e$, from their outer and open ends are threaded inwardly for a portion of their length and have a plurality of orifices $g$ therethrough in proximity to the outer ends.

$h$ are annular rings or flanges on the sleeves $f$ and $i$ are loops or brackets forming part with or secured to the springs or body portion of the vehicle.

$j$ is a sleeve or casing surrounding the axle $a$ and extending into the sleeves $f$ and fixedly secured therein.

$k$ are collars encircling the axle $a$ around a portion of the reduced outer ends $b$ and abutting the shoulders $c$. The inner end of each of the collars $k$ has a flange portion $l$, the outer face $m$ of which is beveled forming a substantially cone shaped bed or bearing surface.

$n$ is a ring of metal encircling the collar $k$ and formed angularly having the sections $o$ and $p$, the interior walls of said sections forming the opposing bearing surfaces for the balls $q$ to the cone shaped bearing surface $m$. The ring $n$ fits loosely within the housing $e$.

$r$ is a ring encircling the collar $k$ to the outside of the section $o$ of the ring $n$ and having a pair of bosses $s$ diametrically arranged from one side thereof and bearing against the outer face of the section $o$ of the ring $n$ and the bosses $t$ diametrically arranged on the opposite side thereof and preferably right angularly arranged in relation to the said bosses $s$. The bosses $s$ and $t$ are preferably rounded upon the outer end.

$u$ is a ring of metal formed angularly having the sections $v$ and $w$ and is of similar construction to the ring $n$. The inner face of the section $v$ of the ring $u$ is arranged in proximity to the ring $r$ and bears against the bosses $t$. The section $w$ of the ring $u$ is threaded correspondingly to the interior wall of the housing or cylindrical casing $e$ and screwed thereinto so that the section $v$ may be adjusted to and from the bosses $t$ of the ring $r$ and thus adjust the ring $n$ and consequently adjust the ball bearings $q$. The ring $n$, which forms the ball cup fitting loosely within the housing $e$, has a certain limited freedom of movement in order to accommodate itself to any inaccuracies or unevenness in the construction, either of the said cup or the cone, or other causes whereby the axle would assume a different position, making it helpful to the running of the bearing and also saving of wear and tear of the said ball cup and cone.

$x$ is a groove in the inner surface of the section $w$ of the ring $u$ and close to the outer edge thereof.

$y$ are notches cut in the edge of the section $w$ and extend inwardly past the groove $x$. The notches $y$ are provided to allow the ring $u$ to be screwed in and out of the housing $e$ by the use of as panner wrench which engages the said notches.

$z$ is a spring ring inserted in the ring $u$ and resting in the groove $x$ and having an outwardly bent portion 2 which projects through one of the notches $y$ and springs into the orifices $g$ in the housing $e$ thereby retaining the ring $u$ in a fixed position. It will be readily understood that the portion 2 may be easily disengaged from the holes $g$ by lifting the spring ring $z$ from the groove $x$.

3 is a washer preferably of felt encircling the collar $k$ at the outer end thereof and abutting the section $v$ of the ring $u$.

4 is a washer encircling the reduced outer end $b$ of the axle and abutting the end of the collar $k$ and fitting closely against the washer 3.

5 is the hub of the wheel mounted on the reduced portion $b$ of the axle $a$ and having the bushing 6 at its inner end abutting the washer 4 and extending to the threaded reduced portion $d$ and closely encircling said axle but free to turn thereon. The hub 5 is held on the axle by the retaining washer 7 which abuts the outer end of the bushing 6 and is held in position by the retaining nut 8 on the threaded end $d$ of said axle.

In the operation and the use of this device the sleeve $f$ is suitably secured by springs or otherwise to the body of the vehicle thus forming a secure support from the body of the vehicle for the bearing inclosed by the housing $e$. The axle $a$ as described, extends through said sleeves and housings and has the fixed collar $k$ secured thereon. The cone shaped surface $m$ formed on said collar, with the ball cup or socket formed by the ring $n$, and the balls $q$, complete the bearing in which said axle turns. The ring $r$ having the rigid backing on its outer side formed by the section $v$ of the ring $u$ forms the means for permitting said ball cup or socket for the balls to assume different positions, in other words the said ring $r$ will allow a certain rocking motion to the said ball cup as the ball cup bears against the said washer only on the projections or bosses $s$ of the ring $r$ and the said ring bears against the section $v$ of the ring $u$ only on the points of the bosses $t$ and consequently the said ball cup will tilt in any direction and accommodate itself in relation to the fixed cone bearing surface of the collar $k$ no matter what position the axle may assume.

The great advantages of this invention are that both the axle and the wheels are free to turn and while the wheel may turn of itself on the axle yet it will not do so when a freer turning bearing is provided for the said axle, and it will be seen from the description herein that a ball bearing is provided for the axle, therefore, in the present construction the axle will turn and not the wheel, but in the event of any accident happening and causing the axle to stick in its bearings the wheels will turn freely on the outer ends of said axle, also, when the vehicle is turning a corner no undue strain will be put upon the wheels or axle, as the nigh wheel may remain stationary while the outside wheel turns freely.

In ordinary ball bearings where the cone and ball cup are fixedly secured to their respective members, a very slight inaccuracy in the grinding of said cup or cone will throw them out of center and consequently cause the load to be carried at intervals by only one or possibly two balls, the result being that the balls are crushed or the surface of either the cone or cup fractured. The compensating or tilting ring in conjunction with a loose ball cup as described entirely overcomes such inaccuracies and accomplishes the results hereinbefore described.

What I claim as my invention is:—

1. In a running gear for vehicles, the combination with the vehicle body support, of a rotating axle, a housing rigidly secured to said body support, a ball cup contained within said housing and adapted to tilt in relation to the movement of said axle, a journal formed on said axle, balls introduced into said cup and bearing on said journal, means for accommodating the tilt in said ball cup, and wheels loosely turning on the ends of said axle, substantially as described.

2. In a running gear for vehicles, the combination with the vehicle body support, of a rotating axle, a collar encircling said axle in proximity to each end thereof and secured thereto having a cone shaped bearing surface, cylindrical casings surrounding said axle forming housings and inclosing said collars and supported from said vehicle body support, a sleeve surrounding said axle and fixedly secured to said housings, a ball cup surrounding said axle within said housings, balls bearing on said ball cup and said cone shaped bearing surface, a tiltable ring within said housing abutting said ball cup, a ring rigidly secured in the outer end of said housings and abutting the aforesaid ring, means for retaining said ring in a fixed position, wheels mounted on the ends of said axle, and means for retaining said wheels on said axle, as and for the purpose specified.

3. In a running gear for vehicles, the combination with the vehicle body support, of a rotating axle having reduced outer ends, a collar encircling each of said reduced ends and secured thereto having an enlarged inner end and a cone shaped bearing surface at said enlarged end, a cylindrical casing surrounding said axle having the ends thereof forming housings and inclosing said collars and supported from said vehicle body support, an angularly shaped ring in said housings having the interior walls thereof forming an opposing bearing surface to said cone shaped bearing surface, balls bearing on said bearing surfaces, a ring encircling said collar to the outside of said ring having a pair of projections diametrically arranged on one side thereof and bearing against said ring and a pair of projections diametrically arranged on the other face thereof preferably at right angles in relation to the other pair, a ring rigidly secured in said housings and abutting the outer pair of projections on said ring, means for retaining said ring in a fixed position, wheels mounted on the outer ends of said axle, and means for retaining said wheels on said axle, as and for the purpose specified.

4. In a running gear for vehicles, the combination with the vehicle body support, of a rotating axle having reduced outer ends forming shoulders, a collar encircling each of said reduced ends for a portion of their length and abutting said shoulders and secured thereto having an enlarged inner end and a cone shaped bearing surface at said enlarged end, a cylindrical casing surrounding said axle having the ends thereof forming housings and inclosing said collars and screw threaded at the outer end thereof and supported from said vehicle body support, an angularly shaped ring in said housings having the interior walls thereof forming an opposing bearing surface to said cone shaped bearing surface, balls bearing on said bearing surfacese, a ring encircling said collar to the outside of said ring having a pair of projections diametrically arranged on one side thereof and bearing against said ring and a pair of projections diametrically arranged on the other face thereof preferably at right angles in relation to the other pair, an angularly shaped ring having one of the sections thereof screw threaded and engaging the threaded portion of said housings and the vertical section thereof abutting the projections on the outer face of said ring, means for retaining said ring in a fixed position, wheels rotatably mounted on the outer reduced ends of said axle, and means for retaining said wheels on said axle, as and for the purpose specified.

5. In a running gear for vehicles, the combination with the vehicle body support, of a rotating axle having reduced outer ends forming shoulders intermediate of its length, a collar encircling each of said reduced outer ends for a portion of their length and having the inner end thereof abutting said shoulder and rising at an incline to form a cone shaped bearing surface, a cylindrical casing surrounding said axle for a portion of its length having the outer ends thereof enlarged and forming housings screw threaded on the interior surface at the outer end thereof and inclosing said collars and holes through said housings near the outer edge thereof, said cylindrical casing being suitably supported from said vehicle body support, an angularly shaped ring within said housings surrounding said collar having the interior walls thereof forming an opposing bearing surface to said cone shaped bearing surface on said collar, said ring forming a ball cup or socket in each of said housings, a ring encircling said collar to the outside of the vertical section of the aforesaid ring having a pair of bosses diametrically arranged on one side thereof and abutting the aforesaid ring and a pair of bosses diametrically arranged on the other side of said ring at right angles in relation to the other pair of bosses, an angularly shaped ring having the vertical section thereof abutting the bosses on the outer face of said ring and the other section screw threaded and engaging the threaded portion of said housing and having a groove on the interior surface thereof and notches from the outer edge of said groove, a spring ring inserted in said groove having a projection therefrom extending through one of said notches and engaging the holes in the end of said housing, a felt washer encircling said collar at the outer end thereof and abutting the outer face of the vertical section of the outer angularly shaped ring, a washer encircling the reduced end of said axle and abutting the outer end of said collar and said felt washer, a pair of wheels having a hub and a suitable bushing in said hub and mounted on said axle at the ends thereof and means for retaining said wheels on said axle, as and for the purpose specified.

Signed at Kingston, Ca., in the county of Frontenac, in the Province of Ontario, Dominion of Canada, this sixth day of April, 1906.

THOMAS FRASER VAN LUVEN.

Witnesses:
INA L. MILLER,
A. M. CHISHOLM.